United States Patent [19]

Fischer

[11] Patent Number: 5,397,146

[45] Date of Patent: Mar. 14, 1995

[54] BICYCLE FRAME PROTECTION DEVICE

[76] Inventor: David S. Fischer, 623 No. New Ballas Rd., St. Louis, Mo. 63141

[21] Appl. No.: 207,137

[22] Filed: Mar. 7, 1994

[51] Int. Cl.$^6$ ............................................. B62J 23/00
[52] U.S. Cl. ................................. 280/288.4; 280/770
[58] Field of Search ................. 280/288.4, 847, 152.1, 280/152.3, 851, 852, 274, 281.1, 751, 770, 304.3; 224/34, 30 R, 35

[56] References Cited

U.S. PATENT DOCUMENTS

| | | | |
|---|---|---|---|
| 4,226,347 | 10/1980 | Rice | 224/35 |
| 4,720,027 | 1/1988 | Board | 224/35 |
| 5,052,704 | 10/1991 | Nauman | 280/288.4 X |

Primary Examiner—Margaret A. Focarino
Assistant Examiner—Kevin Hurley
Attorney, Agent, or Firm—Haverstock, Garrett & Roberts

[57] ABSTRACT

A protective device for protecting a frame member of a bicycle is disclosed. The device comprises a tubular section having a frame member engaging surface and an exterior surface which is opposite to the frame member engaging surface, the frame member engaging surface and the exterior surface forming a first edge defining a first aligning portion along the first edge. The frame member engaging surface and the exterior surface further form a second edge defining a second aligning portion along the second edge. The first and second edges are spaced apart from each other and opposite from each other when the tubular section is around the frame member in a protective position. The tubular section is dimensioned to span substantially the length of the frame member when the tubular section is positioned over the frame member and the aligning portions are positionable around the frame member when the tubular section is positioned over the frame member. The alignment portions establish an alignment configuration with respect to the frame member when the tubular section is positioned over the frame member, such alignment configuration thereafter being maintainable while the bicycle is in use.

20 Claims, 2 Drawing Sheets

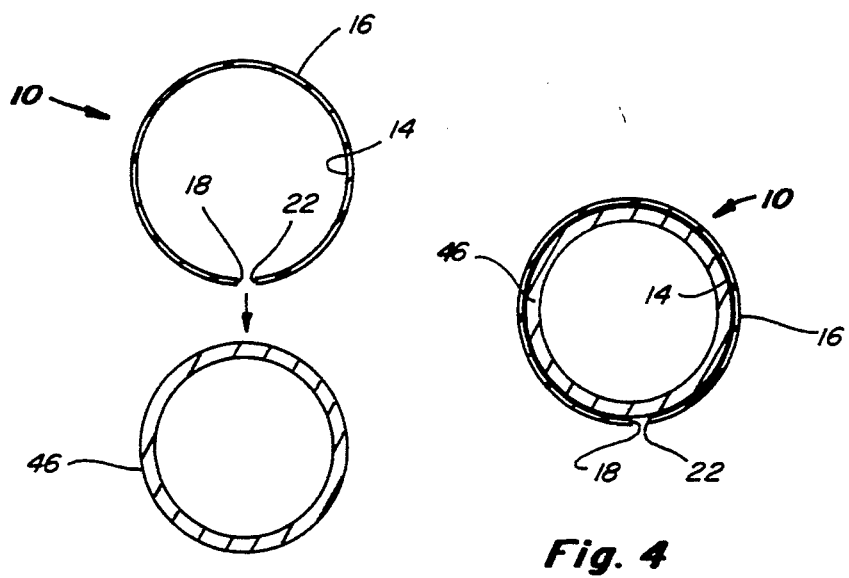
Fig. 5  Fig. 4
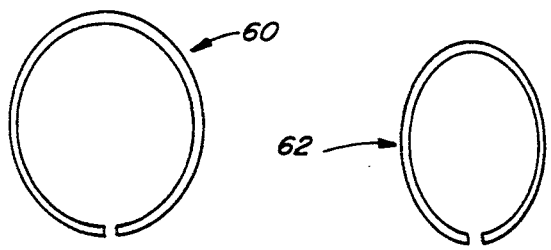
Fig. 6  Fig. 7
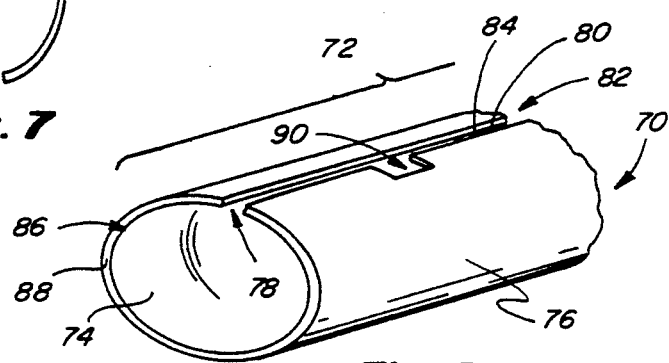
Fig. 8
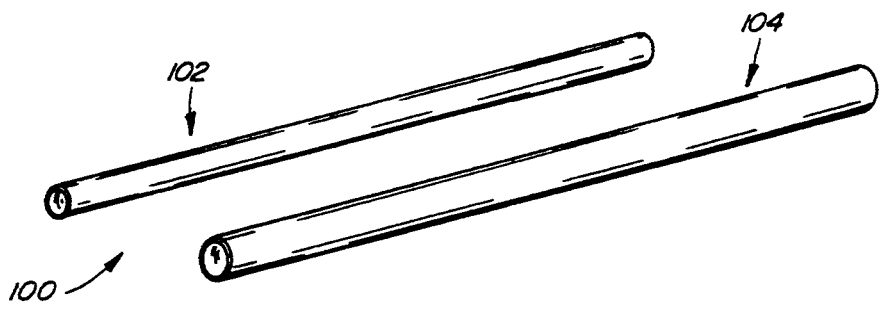
Fig. 9

BICYCLE FRAME PROTECTION DEVICE

BACKGROUND OF THE INVENTION

The present invention relates to a device for protecting frame members of a bicycle, and more particularly to a bicycle frame protection device which protects frame members of the bicycle from being damaged.

Bicycles, such as mountain bikes and road bikes, are well known. Commonly, such mountain bikes are constructed of tubular frame members which are welded together to form a bicycle frame. The bicycle frame may be left unfinished or it may be finished with paint. In either the unfinished or finished state the frame is susceptible to damage when left unattended or in use. Such damage may be a marred or scratched finish. Therefore, unless some care is exercised, the bicycle frame, which tends to be expensive, may be damaged in many instances which is frustrating to the owner.

Protecting the frame and the individual frame members or components becomes an important consideration. However, there is presently no devices for protecting the finish of a bicycle frame. If a protection device is to be readily acceptable by bicycle owners and users it must be able to easily protect the bicycle frame, be easy to use, and require no modifications to the bicycle.

The present invention is designed to obviate and overcome many of the disadvantages and shortcomings experienced with not protecting the bicycle frame or the individual components of the bicycle frame. Moreover, the present invention can be easily utilized to protect the frame and frame members of a bicycle.

SUMMARY OF THE INVENTION

A protective device for protecting a frame member of a bicycle comprises a tubular section having a frame member engaging surface and an exterior surface which is opposite to the frame member engaging surface, the frame member engaging surface and the exterior surface forming a first edge defining a first aligning portion along the first edge, the frame member engaging surface and the exterior surface further forming a second edge defining a second aligning portion along the second edge, the first and second edges being spaced apart from each other and opposite from each other when the tubular section is around the frame member in a protective position, the tubular section being dimensioned to span substantially the length of the frame member when the tubular section is positioned over the frame member, the aligning portions being positionable around the frame member when the tubular section is positioned over the frame member, the alignment portions establishing an alignment configuration with respect to the frame member when the tubular section is positioned over the frame member, such alignment configuration thereafter being maintainable while the bicycle is in use.

In another form of the present invention, a protective device for protecting a frame member of a bicycle comprises a tubular section having a frame member engaging surface and an exterior surface which is opposite to the frame member engaging surface, the frame member engaging surface and the exterior surface forming a first edge defining a first aligning portion along the first edge, the frame member engaging surface and the exterior surface forming a second edge defining a second aligning portion along the second edge, the frame member engaging surface and the exterior surface further forming a third edge defining a third aligning portion along the third edge, the first and second edges being spaced apart from each other and opposite from each other when the tubular section is around the frame member in a protective position, the second and third edges being spaced apart from each other and opposite from each other when the tubular section is around the frame member in a protective position, the tubular section being dimensioned to span a portion of the length of the frame member when the tubular section is positioned over the frame member, the aligning portions being positionable around the frame member when the tubular section is positioned over the frame member, the alignment portions establishing an alignment configuration with respect to the frame member when the tubular section is positioned over the frame member, such alignment configuration thereafter being maintainable while the bicycle is in use.

In still another form of the present invention, a kit for protecting at least two frame members of a bicycle, each of the frame members having a length and a diameter with each length and diameter being different, comprises a first tubular section and a second tubular section with each of the sections having a frame member engaging surface and an exterior surface which is opposite to the frame member engaging surface, the frame member engaging surface and the exterior surface forming a first edge defining a first aligning portion along the first edge, the frame member engaging surface and the exterior surface further forming a second edge defining a second aligning portion along the second edge, the first and second edges being spaced apart from each other and opposite from each other when each of the tubular sections is around the frame member in a protective position, each of the tubular sections being dimensioned to span substantially the length of the frame member when the tubular section is positioned over the frame member, the aligning portions being positionable around the frame member when the tubular section is positioned over the frame member, the alignment portions establishing an alignment configuration with respect to the frame member when the tubular section is positioned over the frame member, such alignment configuration thereafter being maintainable while the bicycle is in use.

In light of the foregoing comments, it will be recognized that a principal object of the present invention is to provide a bicycle frame protection device which is of simple construction and design and which can be easily employed with highly reliable results.

Another object of the invention is to provide a bicycle protection device which may be of one piece construction and which does not require attachment to the bicycle frame.

A further object of the invention is to provide a bicycle protection device which is made of a relatively lightweight material so that it can be easily positioned, secured in place, and easily removed.

A still further object of the present invention is to provided a bicycle frame protection device which is flexible and easy to use.

These and other objects and advantages of the present invention will become apparent after considering the following detailed specification in conjunction with the accompanying drawings, wherein:

BRIEF DESCRIPTION OF THE DRAWINGS

FIG. 4 is an enlarged cross sectional view of the bicycle frame protection device taken along the plane of line 4—4 of FIG. 3;

FIG. 5 is a cross sectional view of the bicycle frame protection device of FIG. 4;

FIG. 6 is an end view of another embodiment of a bicycle frame protection device constructed according to the present invention;

FIG. 7 is an end view of another embodiment of a bicycle frame protection device constructed according to the present invention;

FIG. 8 is a partial perspective view of another preferred embodiment of a bicycle frame protection device constructed according to the present invention;

FIG. 9 is a perspective view of another preferred embodiment of a bicycle frame protection device constructed according to the present invention.

DETAILED DESCRIPTION OF THE PREFERRED EMBODIMENTS

Figure 1:
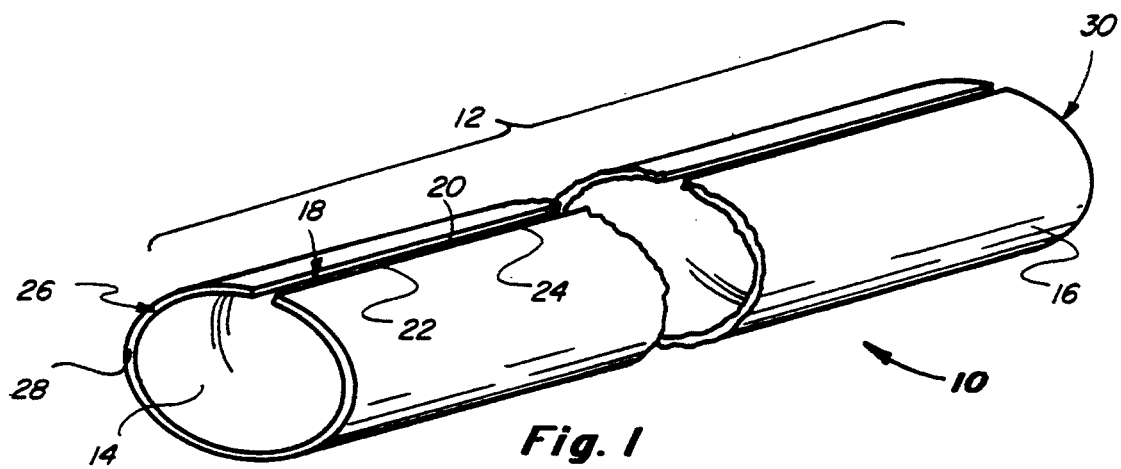
FIG. 1 is a perspective sectional view of a preferred embodiment of a bicycle frame protection device constructed according to the present invention.
Figure 2:
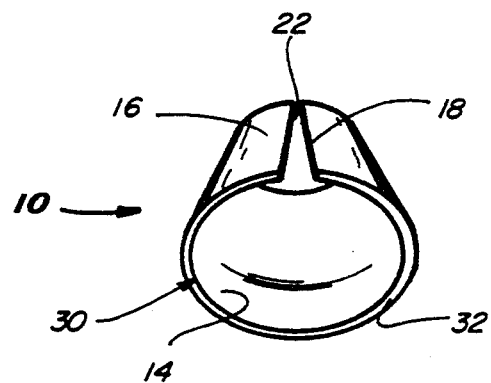
FIG. 2 is an end view of the bicycle frame protection device of FIG. 1.

Referring now to the drawings, wherein like numbers refer to like items, number 10 identifies a preferred embodiment of the bicycle frame protection device of the present invention. The bicycle frame protection device 10, as shown in FIGS. 1 and 2, comprises a tubular section 12 having a frame member engaging surface 14 and an exterior surface 16 which is opposite to the frame member engaging surface 14. The frame member engaging surface 14 and the exterior surface 16 form a first edge 18 with the first edge 18 defining a first alignment portion 20. The frame member engaging surface 14 and the exterior surface 16 further form a second edge 22 with the second edge defining a second alignment portion 24. The first edge 18 and the second 22 are spaced apart from each other along the entire length of the tubular section 12. The tubular section 12 is c-shaped and has a generally circular or oval cross-section. The bicycle frame protection device 10 further comprises a first end 26 having a first end surface 28. At the end opposite the first end 26 is a second end 30 having a second end surface 32.

Preferably, the bicycle protection device 10 will be constructed of a relatively lightweight material so that it can be easily positioned, secured in place, and removed. The bicycle frame protection device 10 may be constructed of a clear and flexible tubing such as PVC (polyvinyl chloride) tubing. The firmness of the tubing should be in the range of about 65 to 95 durometers. The tubing may be extruded and straight. The preferred thickness of the device 10 is in the range of about 1 to 3 mm. It is also desirable that the device 10 incorporate UV (ultra violet) protection. If at all possible the tubing should be made from recyclable products.

Figure 3:
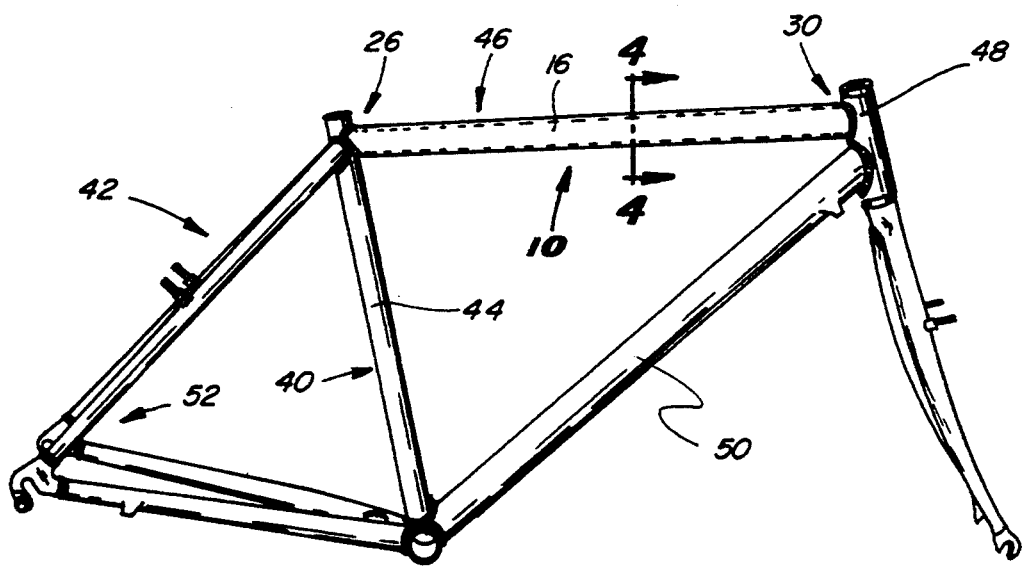
FIG. 3 is a reduced perspective view of the bicycle frame protection device of FIG. 1 shown installed on a bicycle.

Referring now to FIG. 3, there is illustrated a frame 40 of a typical mountain bike 42. The frame 40 of the mountain bike 42 consists of a seat post member 44 to which is welded a cross member 46. A from drive fork member 48 is welded to the other end of the cross member 46. Another cross member 50 is welded between the seat post member 44 and the front drive fork member 48. The frame 40 also includes a rear wheel frame assembly 52 welded to the seat post member 44. The various members 44, 46, and 50 of the frame 40 are of different lengths and diameters. Additionally, the various members 44, 46, and 50 may be of different cross sectional shapes. For example, member 44 may be circular in cross-section while member 46 may be oval in cross-section.

The bicycle frame protection device 10 is shown in FIG. 3 on and around the cross member 46. The end 26 of the bicycle frame protection device 10 has been cut to fit the shape of the end of the cross member 46 which is welded to the seat post member 44. The other end 30 of the bicycle frame protection device 10 has also been cut to fit the shape of the end of the cross member 46 which is welded to the front drive fork member 48. Additionally, the length of the bicycle frame protection device 10 has been cut to fit the length of the cross member 46. Although the ends 26 and 30 are shown to be trimmed to fit the respective shapes of the ends of the cross member 46, it is to be understood that the ends 26 and 30 could be trimmed only to span a portion of the length of the cross member 46 without regard to the particular shapes of the ends of the cross member 46. Additionally, if the length of the bicycle frame protection device 10 is such that it would fit on the particular member 44, 46, or 50 without the need for trimming, it is possible to just place the device 10 on the member without trimming to accommodate for length. Although not shown, it is also to be understood that a bicycle frame protection device 10 may also be placed on the other members 44, 48, and 50. A bicycle frame protection device 10 may also be placed on any of the members of the rear wheel frame assembly 52.

Referring now to FIG. 4, a cross sectional view of the bicycle frame protection device 10 is shown placed on the cross member 46 of the bicycle 42. The frame engaging surface 14 is shown engaging the surface of the cross member 46. Additionally, the exterior surface 16 of the bicycle frame protection device 10 is also shown. The first edge 18 and the second edge 22 are illustrated as being spaced apart from each other. The gap between the first edge 18 and the second edge 22 is preferably one-eighth of an inch. However, this gap may be wider or narrower depending upon the diameter of the cross member 46. As was previously discussed, the first edge 18 defines a first alignment portion 20 and the second edge 22 defines a second alignment portion 24. The first alignment portion 20 and the second alignment portion 24 are positionable around the cross member 46. The first alignment portion 20 and the second alignment portion 24 establish an alignment configuration when the device 10 is positioned over the cross member 46. In this particular instance, the alignment configuration is such that the first edge 18 and the second edge 22 are aligned on the bottom of the cross member 46. The alignment configuration is maintainable in this position when the bicycle 42 is in use. It is to be recognized that due to the material with which the device 10 is constructed of, that if the device 10 is left on the cross member 46 for an extended period of time, the device 10 will mold to the shape of the cross member 46.

As shown in FIG. 5, the bicycle frame protection device 10 is placed over the cross member 46 by spreading apart the first edge 18 and the second edge 22 and slipping the tubular section 12 over the cross member 46. Once the device 10 is placed over the cross member 46 the tubular section 12 may be aligned in any alignment configuration by turning the tubular section 12 to the desired position. Additionally, the first alignment portion 20 and the second alignment portion 24 are used to establish the alignment configuration. The device 10 is removed by separating the first edge 18 and the second edge 22 and lifting the entire tubular section 12 off of the cross member 46. Due to the flexibility of the material from which the device 10 is constructed, placement of the device 10 or removal of the device 10 from the cross member 46 is a relatively easy process. Removal of the device 10 may be required to clean the device 10 or the bicycle 42 which both tend to get muddy during use.

Although the preferred embodiment of the device 10 is of a circular cross-section or shape, it should be recognized that the bicycle frame protection device 10 of the present invention may take many different forms and shapes. The different forms and shapes are dependent upon the form and shape of the frame member to be protected. For example, FIG. 6 shows a bicycle frame protection device 60 having an oval shape or cross-section. FIG. 7 shows a bicycle frame protection device 62 having an exaggerated oval or egg shape or cross-section. Other forms and shapes of the device 10 are also possible.

With reference to FIG. 8, another embodiment 70 of the bicycle frame protection device is shown. The bicycle frame protection device 70 comprises a tubular section 72 having a frame member engaging surface 74 and an exterior surface 76 which is opposite to the frame member engaging surface 74. The frame member engaging surface 74 and the exterior surface 76 form a first edge 78 with the first edge 78 defining a first alignment portion 80. The frame member engaging surface 74 and the exterior surface 76 further form a second edge 82 with the second edge defining a second alignment portion 84. The first and second edges 78 and 82 are spaced apart from each other along the entire length of the tubular section 72. The tubular section 72 is c-shaped and has a generally circular or oval cross-section. The bicycle frame protection device 70 further comprises a first end 86 having a first end surface 88. At the end opposite the first end 86 is a second end having a second end surface, both of which are not shown. The bicycle frame protection device 70 further comprises a third edge 90 defining a third alignment portion 92. The third alignment portion 92 is shown in FIG. 8 as being a box shaped cutout, however, other shapes or cutouts are contemplated. Additionally, only one third alignment portion 92 is shown, however, several other cutouts may be placed along the first edge 78 or the second edge 82. The third alignment portion 92 facilitates separation of the first edge 78 and the second edge 82, removal of the bicycle frame protection device 70 from the bicycle 42, and placement of the device 70 in an alignment configuration.

FIG. 9 illustrates a kit 100 of the present invention. Since it is known that the frame members of bicycles are of different lengths, shapes, and diameters, the kit 100 may contain at least two bicycle frame protection devices 102 and 104 having different diameters, lengths, and/or shapes. The user of the kit 100 may trim to the desired length and shape each of the devices 102 and 104. The devices 102 and 104 are similar to the device 10 with the only differences being the particular diameter, shape, and length of each of the devices 102 and 104. Additionally, the devices 102 and 104 may also be similar to the device 70 with the only differences being the particular diameter, shape, and length of each of the devices 102 and 104.

From all that has been said, it will be clear that there has thus been shown and described herein a bicycle frame protection device which fulfills the various objects and advantages sought therefor. It will be apparent to those skilled in the art, however, that many changes, modifications, variations, and other uses and applications of the subject bicycle frame protection device are possible and contemplated. All changes, modifications, variations, and other uses and applications which do not depart from the spirit and scope of the invention are deemed to be covered by the invention, which is limited only by the claims which follow.

What is claimed is:

1. A protective device adapted for protecting a frame member of a bicycle, the device comprising a tubular section constructed of PVC and having a frame member engaging surface and an exterior surface which is opposite to the frame member engaging surface, the frame member engaging surface and the exterior surface forming a first edge defining a first aligning portion along the first edge, the frame member engaging surface and the exterior surface further forming a second edge defining a second aligning portion along the second edge, the first and second edges adapted to be spaced apart from each other and opposite from each other when the tubular section is around the frame member in a protective position, the aligning portions adapted to be positionable around the frame member when the tubular section is positioned over the frame member, and the alignment portions adapted to establish an alignment configuration with respect to the frame member when the tubular section is positioned over the frame member.

2. The protective device of claim 1 further comprising a pair of spaced apart ends with each of the ends having an end surface, each of the ends being adapted to be trimmed to size the tubular section.

3. The protective device of claim 1 wherein the tubular section is c-shaped.

4. The protective device of claim 1 wherein each of the edges has a thickness in the range of about 1 to 3 mm.

5. The protective device of claim 1 wherein the device has a firmness in the range of about 65 to 95 durometers.

6. A protective device adapted for protecting a frame member of a bicycle, the device comprising a tubular section having a frame member engaging surface and an exterior surface which is opposite to the frame member engaging surface, the frame member engaging surface and the exterior surface forming a first edge defining a first aligning portion along the first edge, the frame member engaging surface and the exterior surface forming a second edge defining a second aligning portion along the second edge, the frame member engaging surface and the exterior surface further forming a third edge defining a third aligning portion along the third edge, the first and second edges adapted to be spaced apart from each other and opposite from each other when the tubular section is around the frame member in a protective position, the second and third edges adapted to be spaced apart from each other and opposite from each other when the tubular section is around the frame member in a protective position, the aligning portions adapted to be positionable around the frame member when the tubular section is positioned over the frame member, and the alignment portions adapted to establish an alignment configuration with respect to the frame member when the tubular section is positioned over the frame member.

7. The protective device of claim 6 wherein the third edge is set back from the first edge.

8. The protective device of claim 6 further comprising a plurality of third edges formed along the first edge.

9. The protective device of claim 6 further comprising a plurality of third edges formed along the second edge.

10. The protective device of claim 6 further comprising a plurality of third edges formed along both the first edge and the second edge.

11. The protective device of claim 6 further comprising a pair of spaced apart ends with each of the ends having an end surface, each of the ends being adapted to be trimmed to size the tubular section.

12. The protective device of claim 6 wherein the tubular section is c-shaped.

13. The protective device of claim 6 wherein the device is constructed of PVC.

14. The protective device of claim 6 wherein each of the edges has a thickness in the range of about 1 to 3 mm.

15. The protective device of claim 6 wherein the device has a firmness in the range of about 65 to 95 durometers.

16. A kit adapted for protecting at least two frame members of a bicycle, the kit comprising a first tubular section and a second tubular section with each of the sections having a frame member engaging surface and an exterior surface which is opposite to the frame member engaging surface, the frame member engaging surface and the exterior surface forming a first edge defining a first aligning portion along the first edge, the frame member engaging surface and the exterior surface further forming a second edge defining a second aligning portion along the second edge, the first and second edges adapted to be spaced apart from each other and opposite from each other when each of the tubular sections is around each of the frame members in a protective position, the aligning portions adapted to be positionable around each of the frame members when each of the tubular sections is positioned over each of the frame member, and the alignment portions adapted to establish an alignment configuration with respect to each of the frame members when each of the tubular sections is positioned over each of the frame members.

17. The kit of claim 16 wherein each of the tubular sections further comprises a third edge formed by the frame member engaging surface and the exterior surface, the third edge defining a third aligning portion along the third edge.

18. The kit of claim 17 wherein the third edge is set back from the first edge.

19. The kit of claim 16 wherein each of the tubular sections is c-shaped.

20. The kit of claim 16 wherein each of the tubular sections is constructed of PVC.

* * * * *